July 15, 1958    B. P. ARTERBURY ET AL    2,843,399
SAFETY JOINT WITH DETENT LATCH MEANS DISENGAGEABLE
WITHOUT ROTATION
Filed Feb. 16, 1955              2 Sheets-Sheet 1
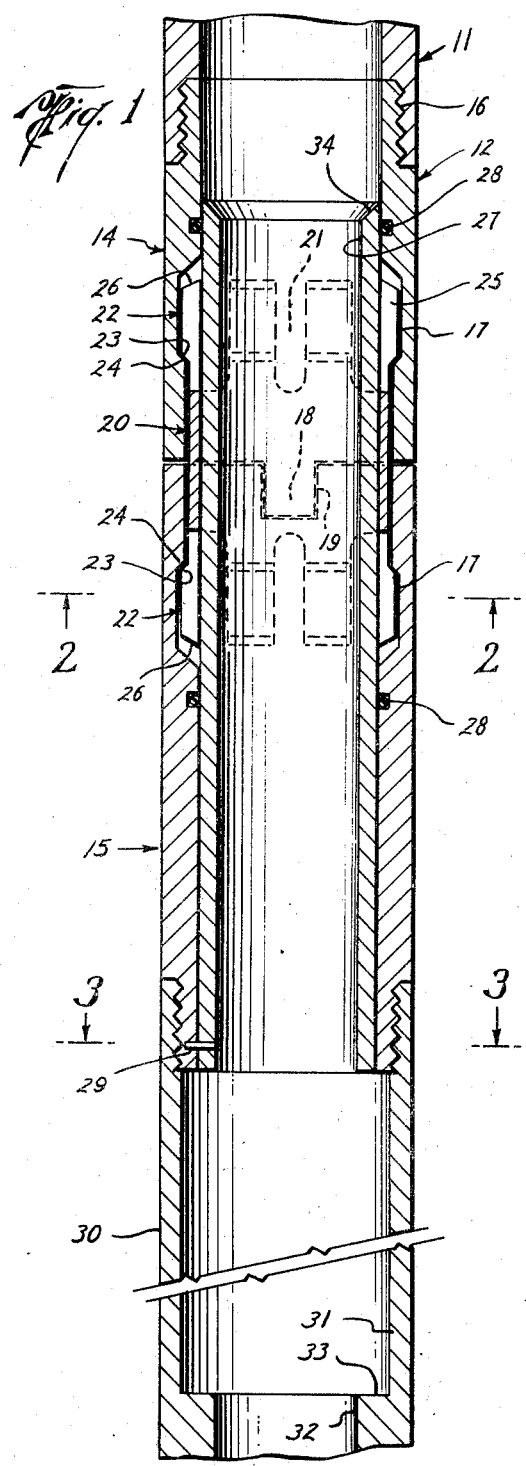
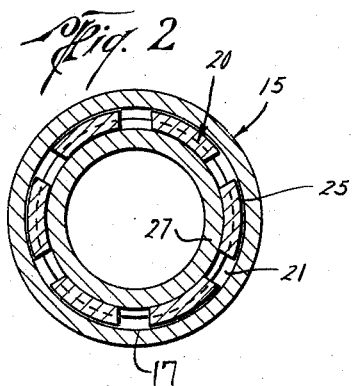
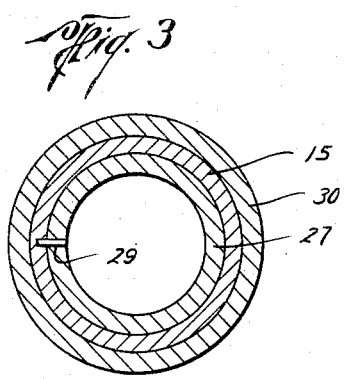
Bryant P. Arterbury
Clifford L. Rawe
           INVENTORS
BY *Wm. E. Ford*
ATTORNEY

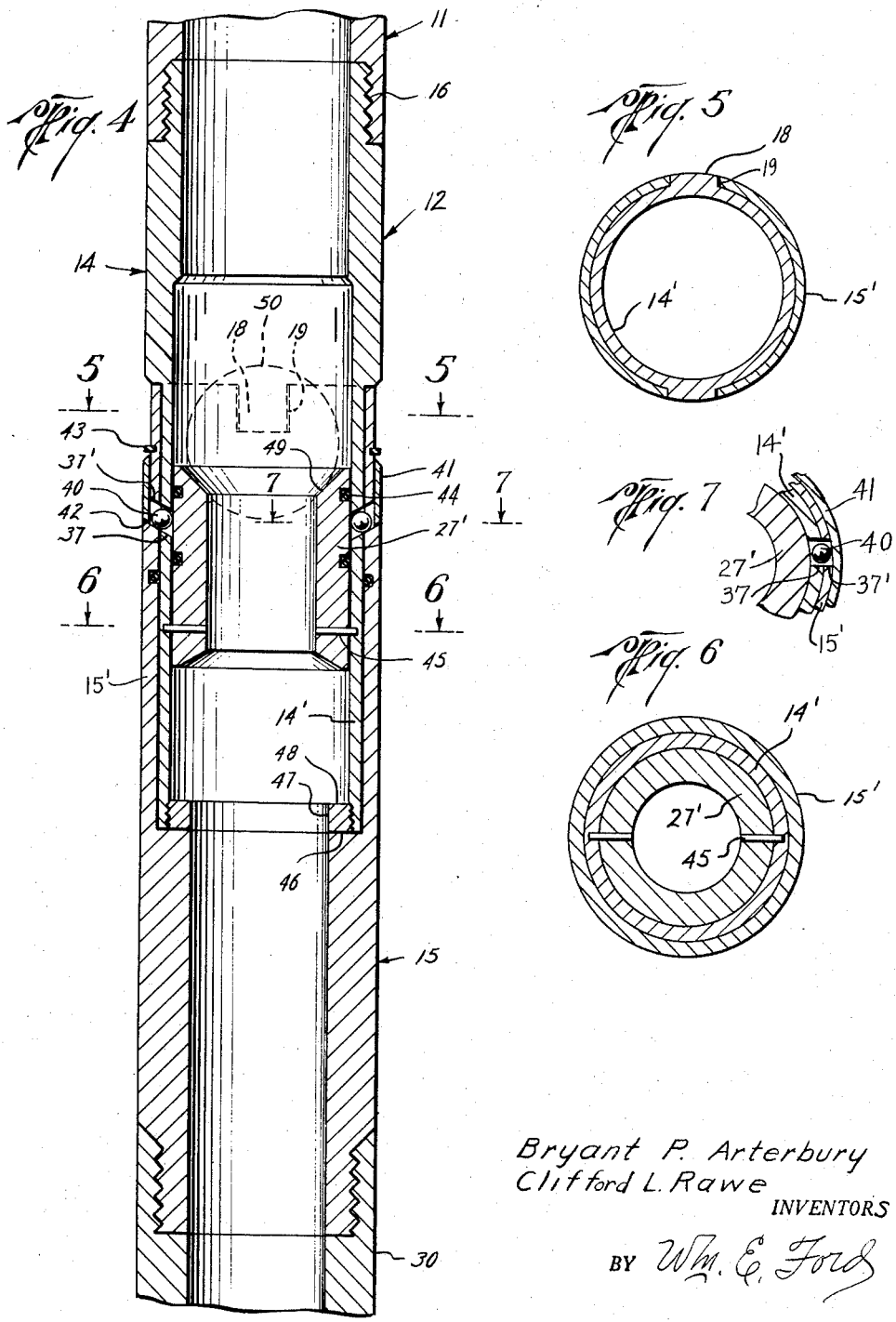

2,843,399

SAFETY JOINT WITH DETENT LATCH MEANS DISENGAGEABLE WITHOUT ROTATION

Bryant P. Arterbury, Houston, and Clifford L. Rawe, Dallas, Tex., assignors of thirty-three and one-third percent to Roy L. Arterbury, Houston, Tex.

Application February 16, 1955, Serial No. 488,610

3 Claims. (Cl. 285—3)

This invention relates to safety joints of the type installed in pipe strings such as pipe strings employed in well bores, the joint comprising two sections disengageable from each other so that the pipe string into which the safety joint is installed may be separated. In particular it relates to a safety joint having sections which are disengaged without rotation of the pipe string.

It is consequently a primary object of this invention to provide a safety joint which is disengageable without rotation by the operation of an axially directed force which conditions the safety joint to permit severance by longitudinal movement of the pipe string.

It is a further object of this invention to provide a safety joint of this class with which the axially directed force which conditions the joint for severance may be fluid pressure or any axially directed mechanical force.

It is also an object of this invention to provide a safety joint of this class which has a central sleeve member therein which effects the inter-clutched engagement of the two safety joint sections and latches them together until such sleeve is moved by an axially directed force.

It is also a further object of this invention to provide a safety joint of this class which is positive in operation and which is constructed of a minimum number of working parts.

Other and further objects will be apparent when the specification hereinbelow is considered in connection with the appended drawings in which:

Fig. 1 is a sectional elevation of one modification of the invention;

Fig. 2 is a sectional plan view taken along line 2—2 of Fig. 1;

Fig. 3 is a sectional plan view taken along line 3—3 of Fig. 1;

Fig. 4 is a sectional elevation of another modification of the invention;

Fig. 5 is a sectional plan view taken along line 5—5 of Fig. 4;

Fig. 6 is a sectional plan view taken along line 6—6 of Fig. 4; and

Fig. 7 is a fragmentary sectional view taken along line 7—7 of Fig. 4.

Referring to Figs. 1–3, a pipe string 11 is shown having connected thereto a safety joint 12 which includes an upper section 14 and a lower section 15. The upper section 14 is threadably connected at 16 into the pipe string 11 and has an annular recess 17 therein spaced below the upper end thereof and for a purpose to be described hereinbelow. A clutch jaw 18 on the lower end of the upper section 14 engages with a receiving slot 19 in the upper end of the lower section 15, also for a purpose to be described hereinbelow. The lower section 15 has a recess 17 therein spaced below the upper end thereof also for a purpose to be described hereinbelow.

In order to latch the sections 14, 15 together a tubular latching member 20 is provided having axial slots 21 in the ends thereof and having larger outer diameter ends 22 which are tapered at 23 to abut correspondingly tapered or cammed surfaces 24 within the recesses 17.

By virtue of the slots 21 the ends 22 of the latching member 20 are converted into radially spaced apart yieldable prongs 25, and the tubular member 20 may be slid into the assembled sections 14, 15 when they are in end to end inter-clutched abutment, the prongs 25 having enough spring therein to retract within the inner diameters of the sections.

The prongs 25 have their outer ends tapered at 26, and when the latching member 20 is slid into the safety joint sections, the leading taper 26 contacts the first surface 24 it abuts and rides inwardly over such surface and in final assembly the leading prongs 25 spring outwardly and recess in the second recess 17 they traverse as the following prongs 25 spring outwardly and recess in the first recess 17 which has been traversed by such leading prongs 25. Optionally, the tubular member 20 may be assembled with one section to extend therefrom, and then the other section may be inserted over the extending end of the member 20, so that the clutch 18 engages the slot 19.

Then a sleeve 27 is slid into the bores of the sections 14, 15, and consequently within the bore of the member 20, such sleeve being of a length to extend in either direction past the recesses 17.

O-rings 28 in annular recesses in the safety joint sections 14, 15 sealably divide off the recesses 17 from the fluids in the well bore upwardly and downwardly therefrom. The sleeve is held in position by a shear pin 29 which connects the sleeve 27 to the lower section 15. The lower section 15 terminates downwardly in an element 30 which may be part of the pipe string 11 or a separate element. This element 30 is recessed at 31 and of an inner diameter 32 to permit the sleeve 27 to shoulder at 33 should the sleeve be lowered from the position shown in Fig. 1.

In operation the member 30 is connected to the lower end of the pipe string 11 or to some other operative element as for instance a fishing tool. Upon a condition arising where it becomes desirable to sever the safety joint so that the upper part of the pipe string 11 may be withdrawn, as from the well bore, it first becomes necessary to arm or condition the safety joint so that disconnection may be effected simply by lifting the upper portion of the pipe string 11 and the upper part of the safety joint connected thereto away from the lower part of the safety joint and any elements connected thereto below.

To this end it is necessary to exert an axially directed force upon the sleeve 27 to shear the shear pin 29 so that the sleeve 27 may move out of latching contact within the latching member 20 to permit the retraction of the prongs 25 from within the recesses 17. A mechanical means may be lowered down the well bore to exert a downwardly acting force on the top of the sleeve 27 to accomplish this purpose or optionally a mechanical means may be lowered through the sleeve 27 which may then expand or be expanded to exert a force on the sleeve 27 to act axially upwardly against the shear pin 29 to effect the shearing thereof. Also a common way of accomplishing shearing can be effected by dropping a ball, not shown, down the well bore to seat at 34 on the upper face of the sleeve 27 to close the sleeve bore. Then fluid may be pumped down the well bore and the pressure thereof built up sufficiently to act against the closure ball and top of the sleeve 27 to shear the pin 29 and force the sleeve 27 downwardly.

When an upwardly lifting force is now exerted on the pipe string 11 the upper prongs 25 of the latching member 20 are retracted inwardly as the cam surface 24 slides upon the cam surface 23 and thus the upper part of the pipe string 11 and the upper section 14 of the safety joint may be withdrawn from the well bore while the lower section 15 of the safety joint, the latch member 20 and the sleeve 27, now shouldered at 33, remain in the well bore.

In every case it is necessary for the sleeve 27 to either be lifted entirely above the latching member 20, or to descend entirely below it to allow for the inward retraction of the prongs 25. As an option of construction the shoulder 33 may be omitted from the element 30 to permit the sleeve 27 to descend thereinto and therethrough.

In practice it can also occur that the upper prongs may not be retracted as readily as the lower prongs in which case the latching member 20 will remain connected to the upper section 14 as the lower prongs 25 retract to permit the latching member to be raised with the pipe string 11 and upper section 14.

In the modification of the invention shown in Figs. 4–7, inclusive, a pipe string 11 has connected thereto or thereinto a safety joint 12 comprising an upper section 14 and a lower section 15. The upper section 14 is threadably connected at 16 into the pipe string 11 and has a reduced diameter lower part 14' having radially spaced apart openings 37 therein for a purpose to be described hereinbelow.

An enlargement or boss 18 on the lower part 14' of the upper section 14 extends outwardly therefrom with outer surface merging with the outer surface of the upper part of the upper section 14, and such enlargement or clutch jaw is received within a slot 19 in the upper end part 15' of the lower section 15, the part 14' being intertelescoped within the enlarged inner diameter part 15' of the lower section 15. The upper part 15' of the lower section 15 also has openings 37' therein to communicate with the openings 37, for a purpose to be hereinafter described.

In order to latch the sections 14, 15 together, as shown in Figs. 4 and 7, a ball 40 of diameter to fit within both of each two communicating openings 37, 37' with slight clearance peripherally, is placed in such openings and a sleeve 27' is slid within the part 14' to occlude the openings 37 and position the balls 40 within the openings 37, 37'. A closure sleeve 41 is slid over the upper end of the upper part 15', such upper end being of reduced outer diameter, so that the closure sleeve 41 shoulders at 42 upon the upper part 15' of the lower section 15. A hold-down ring 43 on such upper end confines the closure sleeve 41 against longitudinal motion.

The latching sleeve 27' is positioned as shown in Fig. 4 by means of shear pins 45 insertable through the sleeve 27' into the lower part 14' of the upper section 14. O-ring seals 44 are provided in the latching sleeve 27' and spaced apart as shown in Fig. 4 on either side of the openings 37, to seal off the openings from pressure fluid in the pipe string 11 when the bore of the sleeve 27' is closed, as will be described hereinbelow.

The lower section 15 is shown having an enlarged inner diameter upper part 15' to provide a shoulder at 46, and an insert ring 47 is threaded within the lower end 14' of the upper section 14 to bear upon the shoulder 46 when the sections 14, 15 are assembled, and to provide a shoulder 48 to receive the latching sleeve 27' when such sleeve may be in lowermost position. Optionally this shoulder 48 and the shoulder 46 may be omitted and inner diameter provided to permit the sleeve 27' to descend into, and/or through the element or member 30.

In operation the member 30 forms the lower end of the pipe string 11 or it may consist of some other operative element, as for instance a fishing tool. Upon a condition arising where it becomes desirable to sever the safety joint so that the upper part of the string 11 thereabove may be withdrawn, as from the well bore, it first becomes necessary to arm or condition the safety joint so that disconnection may be effected simply by lifting the upper position of the pipe string 11 and the upper part of the safety joint connected thereto away from the lower part of the safety joint and any elements connected thereto therebelow.

To this end it is necessary to exert an axially directed force upon the sleeve 27' to shear the pins 45 so that the sleeve 27' may move out of latching occlusion of the openings 37 whereby the balls 40 may roll out of the openings 37', 37, such openings being shown slanted downwardly and inwardly in Fig. 4. A mechanical means may be lowered down the well bore to exert a downwardly acting force on the top of the sleeve 27' to shear the pins 45. Also a mechanical means may be lowered through the sleeve 27' to then expand or be expanded and raised to act axially upwardly against the bottom of the sleeve 27' to shear the pins 45. Also a common way of accomplishing shearing can be effected by dropping a ball 50, shown in dotted lines in Fig. 4, to seat at 49 on the upper face of the sleeve 27' to close the sleeve bore. Then fluid may be pumped down the well bore and the pressure thereof built up sufficiently to act against the closure ball 50 and the top of the sleeve 27' to shear the pins 45, as the upper O-ring 44 prevents the pressure fluid from passing between sleeve 27' and the lower part 14' of the upper section 14.

With any mode of shearing, it is necessary that the sleeve 27' should be free to move a sufficient distance to clear the openings 37 to permit the balls 40 to fall inwardly.

As the pins 45 are sheared the sleeve 27' may descend as shown in Fig. 4, and lodge upon the insert shoulder 48, and when the openings 37 are uncovered the balls 40 will fall out into the well bore. Then an upwardly lifting force may be applied to the pipe string 11 to raise the upper section 14 therewith, and with it the latching sleeve 27', for recovery with the upper part of the pipe string 11. The lower safety joint section 15 and the element 30 constituting the lower end of the pipe string 11, a fishing tool, or any other applicable element, then remains in the well bore.

Both modifications are subject to a range of variation in details of construction. For example the sleeve in the modification of Figs. 1–3 may be shear pin connected to the upper section instead of the lower section as shown. Also the grooves 17 may not be continuous but may have splines extending between the prongs 25.

In either modification the clutch jaw 18 and slot 19 may be reversed as to sections without departing from the spirit of the invention. Additionally, the arrangement of intertelescoping parts in the modification of Figs. 4–7 may be altered without departing from the scope of the invention by a construction in which the lower section intertelescopes within the upper section and in this form the sleeve would be shear pin connected to the lower section. Furthermore, the holes, or openings 37' in the outermost intertelescoping member need not extend through the wall of such member to the outside thereof, whereby the closure sleeve 41 and holddown ring 43 may be eliminated. Also, as an optional form of construction the openings 37' may be replaced by an internal groove in the upper part 15' of the lower section 15, which may extend partially or all around the inner periphery thereof.

Also, as an optional construction it is pointed out that the openings 37 and openings or groove construction 37' need not necessarily slant inwardly and downwardly to insure the inward ejection of the balls 40 upon relative axial movement of the sections 14, 15, since the balls extend into both spaces, and therefore will be assuredly inwardly ejected if such spaces are otherwise slanted.

In the modification of Figs. 4–7, as shown, the interclutching arrangement 18, 19 is not essential to prevent relative rotation between the upper and lower safety joint sections 14, 15, but when the peripheral play between the jaw 18 and the sides of the slot 19 is within a closer tolerance than between the balls 40 and the sides of the opening 37', the balls 40 are protected from being marred by being brought into too forceful contact with the sides of such openings. This same protection is afforded in the modification of Figs. 1–3 when splines extend between the prongs 25 and there is a closer tolerance between the jaw-slot arrangement 18, 19 than between the splines and such prongs 25.

With the modification of Figs. 1–3, as shown (without such splines), the jaw-slot arrangement 18, 19 is required to prevent relative rotation between the sections 14, 15, and with the modification of Figs. 4–7, with a groove, as hereinabove described, replacing the openings 37', the jaw-slot arrangement 18, 19 will be required. However, even in these last two mentioned cases, packers may be installed on either or both of the safety joint sections 14, 15 in a manner to prevent relative rotation therebetween in the absence of the arrangement 18, 19.

It may be noted that in cases the shear pin connection between the sleeve and one section may be omitted, as where the frictional engagement of the O-rings alone may position the sleeve with relation to a section within which it is fitted. Also in cases the shear pin connection may be changed to a slip ring or other connection means.

It is obvious that the structures required for carrying out the broad spirit of this invention are applicable not only in well bores but under a wide range of other conditions where a quickly operable severance means may be required to effect disconnection between two tubular elements. In this regard the invention may have application with tubular elements which extend horizontally as well as vertically, and with such elements as may be employable with machine tools, plant equipment and for a great variety of other usages.

Broadly, this invention is not limited to the details of construction of the modifications shown, but other variations of structure are encompassed as well as may fall within the broad spirit of the invention, and within the broad scope of interpretation claimed and merited for the appended claims.

What is claimed is:

1. A safety joint comprising two interlocked sections adapted at its upper end for connection to a pipe string and at its lower end for connection to a tubular element therebelow, said sections having intercommunicating recesses and latching means entirely within said recesses in both sections for locking said sections against relative longitudinal movement, a sleeve having an outer cylindrical surface and slidable downwardly within the said sections and providing a seating surface to receive an operating member passed through said string, said joint having a cylindrical bore extending above and below said recesses and there sealed to said sleeve, and shear pin means affixing said sleeve to one of said sections and in position to restrain said latching means from the interior of said sections, said sections being disengaged without relative rotation by the application of an axially acting force upon said sleeve to shear said shear pin means and move said sleeve from latch restraining position and with cylindrical outer surface contact only with said cylindrical bore to permit said latching means to move within the interior of said cylindrical portion thereby freeing said upper section to be lifted with said pipe string from said lower section.

2. A safety joint as claimed in claim 1 in which said latching means comprises balls and in which said intercommunicating recesses are holes in said sections.

3. A safety joint as claimed in claim 1 in which said intercommunicating recesses comprise recesses in abutting ends of said sections and a larger recess in each section communicating with the end recess therein and spaced from the end of said section, and in which said latching means comprises a tubular member to fit in said end recesses and around said sleeve, and enlargement detents on either end of said tubular member to fit in said enlarged recesses in latched position.

References Cited in the file of this patent

UNITED STATES PATENTS

| | | |
|---|---|---|
| 367,578 | Babb | Aug. 2, 1887 |
| 573,695 | Penfield | Dec. 22, 1896 |
| 967,395 | Langhaar | Aug. 16, 1910 |
| 1,273,896 | Martin | July 30, 1918 |
| 1,637,908 | Lea | Aug. 2, 1927 |
| 2,159,242 | Yanagi | May 23, 1939 |
| 2,366,067 | Smith | Dec. 26, 1944 |
| 2,401,119 | Taylor | May 28, 1946 |
| 2,485,763 | Moon | Oct. 25, 1949 |
| 2,502,886 | Ragan | Apr. 4, 1950 |
| 2,532,686 | Ware | Dec. 5, 1950 |
| 2,537,183 | Bloomer | Jan. 9, 1951 |
| 2,564,915 | Nelson | Aug. 21, 1951 |
| 2,586,015 | Edwards | Feb. 19, 1952 |

FOREIGN PATENTS

| | | |
|---|---|---|
| 13,936 | Great Britain | July 1, 1908 |